US008368372B2

(12) United States Patent
Penfold

(10) Patent No.: US 8,368,372 B2
(45) Date of Patent: Feb. 5, 2013

(54) SWITCH MODE REGULATOR

(75) Inventor: Justin Penfold, Suffolk (GB)

(73) Assignee: Cambridge Silicon Radio Limited, Cambridge (GB)

( * ) Notice: Subject to any disclaimer, the term of this patent is extended or adjusted under 35 U.S.C. 154(b) by 224 days.

(21) Appl. No.: 12/964,051

(22) Filed: Dec. 9, 2010

(65) Prior Publication Data
US 2011/0148387 A1 Jun. 23, 2011

(30) Foreign Application Priority Data

Dec. 21, 2009 (GB) .................................. 0922196.1

(51) Int. Cl.
G05F 1/00 (2006.01)
(52) U.S. Cl. ........................................................ 323/282
(58) Field of Classification Search ........... 323/282–285
See application file for complete search history.

(56) References Cited

U.S. PATENT DOCUMENTS

| 8,207,711 B2* | 6/2012 | Crawford et al. ............. 323/282 |
| 8,232,667 B2* | 7/2012 | Abraham et al. ................. 307/3 |
| 2005/0024908 A1* | 2/2005 | Gizara ............................ 363/147 |

* cited by examiner

Primary Examiner — Jue Zhang
(74) Attorney, Agent, or Firm — Pillsbury Winthrop Shaw Pittman LLP

(57) ABSTRACT

A switch mode regulator includes a first switch for controlling a current supply to an output inductor of the regulator; a second switch for selectively providing a conductive path to ground for current flowing through the output inductor; and an inverting amplifier having an input connected to an output of the first switch and an output connected to a control input of the second switch. The switch mode regulator may alternatively include a first switch for controlling a current supply to an input inductor of the regulator; a second switch for selectively providing a conductive path to a load for current flowing through the input inductor; and an inverting amplifier having an input connected to an output of the first switch and an output connected to a control input of the second switch.

14 Claims, 3 Drawing Sheets

SWITCH MODE REGULATOR

CROSS-REFERENCE TO RELATED APPLICATION

This application claims foreign priority under 35 U.S.C. §119 to British Patent Application No. 0922196.1, filed Dec. 21, 2009, which is hereby incorporated herein by reference in its entirety.

FIELD

The present invention relates to a switch mode regulator and to an integrated circuit incorporating a switch mode regulator.

BACKGROUND

Switch mode regulators are well known and are used to convert one DC voltage output to another. An example of a switch mode regulator is shown generally at 10 in the schematic illustration of FIG. 1, and comprises a first switch 12 which controls a current supply to an output inductor 14. A second switch 16 is provided for selectively connecting the output inductor 14 to ground, whilst an output capacitor 18 smoothes the output voltage provided by the output inductor 14.

In operation of the switch mode regulator 10 the first switch 12 is switched on and off by a control circuit 22 to alternately connect and disconnect the inductor 14 to a supply voltage, with the resulting current flowing through the inductor 14 into a load 20. The ratio of the time for which the first switch 12 is switched on to the time for which the first switch 12 is switched off is known as the duty cycle.

It is commonplace to use a switch mode regulator 10 in a discontinuous current mode of operation when a low output current is required. In this mode of operation, the current through the output inductor 14 falls to zero for part of the duty cycle of the regulator 10.

When operating in discontinuous mode the output of the regulator has three distinct states:

1) The first switch 12 is switched on. In this mode positive current flows from the supply through the inductor 14 into the load. The current ramps from zero to a peak current;

2) The first switch 12 is switched off and the second switch 16 is switched on. In this mode the voltage at the output of the first switch 12 is zero, and a positive current flows from ground through the switch 16 and the inductor 14 into the load 20. This positive output current ramps down to zero;

3) When the current flowing through the inductor 14 drops to zero both the switches 12, 16 are turned off and the voltage at the input of the inductor 14 is equal to the voltage at the output of the inductor 14. The regulator 10 is in a high-impedance state.

The duration of the first state is defined by control circuitry controlling the switch mode regulator 10.

The start of the second state is defined by the point at which the second switch 16 is turned on. It is important that the timing of this transition is accurate relative to the time when the first switch 12 is turned off. If it is too early, both switches are on at the same time and a current path is provided between supply and ground leading to undesirable losses. If it is too late, a high back-EMF (electromotive force) will be generated across the inductor which can lead to undershoot, excessive voltages, damage to the second switch or other circuitry, and/or undesirable losses.

The end of the second state is defined by the point at which the current flowing through the inductor drops to zero, which is dependent upon external factors and is difficult to predict. Thus, in order to determine the duration of the second state, some means (indicated at 24 in FIG. 1) must be provided for detecting when the current flowing through the inductor 14 drops to zero.

It is important that this detection is accurate, since the detected point at which the current flowing through the inductor 14 drops to zero triggers the third state. If the detection is inaccurate and the second switch 16 is turned off too early or too late a high back-EMF (electromotive force) will be generated across the output inductor, which can lead to overshooting of the desired inductor input voltage and subsequently to ringing at the input of the output inductor 14, damage to either or both of the switches 12, 16 and/or undesirable power loss.

Thus, it is important that the detection of the zero-crossing point (i.e. the point at which the current flowing through the output inductor drops to zero) is fast and accurate. Additionally, to avoid degrading the efficiency of the regulator it is desirable for any additional detection circuitry to have a low quiescent current.

SUMMARY

According to a first aspect of the present disclosure there is provided a switch mode regulator comprising: a first switch for controlling a current supply to an output inductor of the regulator; a second switch for selectively providing a conductive path to ground for current flowing through the output inductor; an inverting amplifier having an input connected to an output of the first switch and an output connected to a control input of the second switch, wherein: i) when the first switch is turned off a back-EMF is developed across the inductor, forcing the input of the inverting amplifier to a low voltage such that its output is driven high causing the second switch to switch on; ii) if the output voltage of the inverting amplifier drops while positive current is flowing in the inductor the on-resistance of the second switch increases, causing the voltage at the input of the inverting amplifier to decrease, leading to a stable operating state; and iii) if the output voltage of the inverting amplifier drops while negative current is flowing in the inductor the on-resistance of the second switch increases, causing the voltage at the input of the inverting amplifier to increase, leading to an unstable operating state resulting in the second switch being switched off.

The switch mode regulator of the first aspect of the disclosure permits very fast and accurate detection of a point at which current through the inductor drops to zero, which in turn leads to very fast and timely switching of the second switch. Thus, the problems of ringing and undesirable losses associated with prior art regulators can be reduced.

According to a second aspect of the present disclosure there is provided a switch mode regulator comprising: a first switch for controlling a current supply to an input inductor of the regulator; a second switch for selectively providing a conductive path to a load for current flowing through the input inductor; an inverting amplifier having an input connected to an output of the first switch and an output connected to a control input of the second switch, wherein: i) when the first switch is turned off a back-EMF is developed across the inductor, forcing the input of the inverting amplifier to a high voltage such that its output is driven low causing the second switch to switch on; ii) if the output voltage of the inverting amplifier increases while positive current is flowing in the inductor the on-resistance of the second switch increases, causing the voltage at the input of the inverting amplifier to increase, leading to a stable operating state; and iii) if the output voltage of the inverting amplifier increases while negative current is flowing in the inductor the on-resistance of the second switch increases, causing the voltage at the input of the inverting amplifier to increase, leading to an unstable operating state resulting in the second switch being switched off.

The input of the inverting amplifier is preferably connected to the output of the first switch by means of a capacitor, with the biasing of the amplifier arranged such that the output of the amplifier is pulled low when the input of the capacitor is static.

The first switch and the second switch may comprise MOSFETs.

Preferably the inverting amplifier has a high gain and draws little quiescent current.

In the switch mode regulator of the first aspect of the disclosure the inverting amplifier may comprise a first resistor-capacitor network coupled to an output P-channel MOSFET, the time constant of the first resistor-capacitor network being selected such that the output P-channel MOSFET conducts a very low current after the output of the inverting amplifier has been driven high.

The inverting amplifier may further comprise a second resistor-capacitor network coupled to an output N-channel MOSFET, the time constant of the second resistor-capacitor network being selected to be approximately equal to an expected duration of an output pulse of a controller of the first switch of the switch mode regulator.

In the switch mode regulator of the second aspect of the disclosure the inverting amplifier may comprise a first resistor-capacitor network coupled to an output N-channel MOSFET, the time constant of the first resistor-capacitor network being selected such that the output N-channel MOSFET conducts a very low current after the output of the inverting amplifier has been driven low.

The inverting amplifier may further comprise a second resistor-capacitor network coupled to an output P-channel MOSFET, the time constant of the second resistor-capacitor network being selected to be approximately equal to an expected duration of an output pulse of a controller of the first switch of the switch mode regulator.

BRIEF DESCRIPTION OF THE DRAWINGS

Embodiments of the disclosure will now be described, strictly by way of example only, with reference to the accompanying drawings, of which

DETAILED DESCRIPTION

Figure 1:
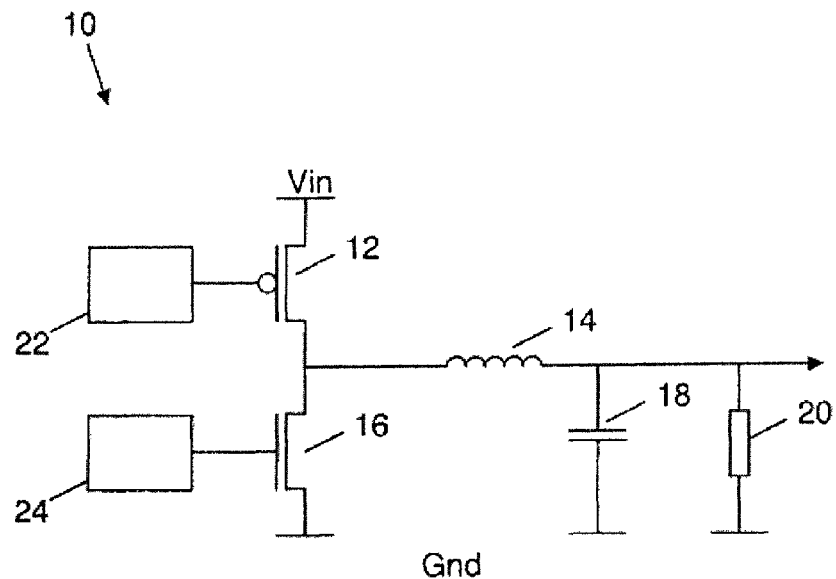
FIG. 1 is a schematic representation of a known switch mode regulator.
Figure 2:
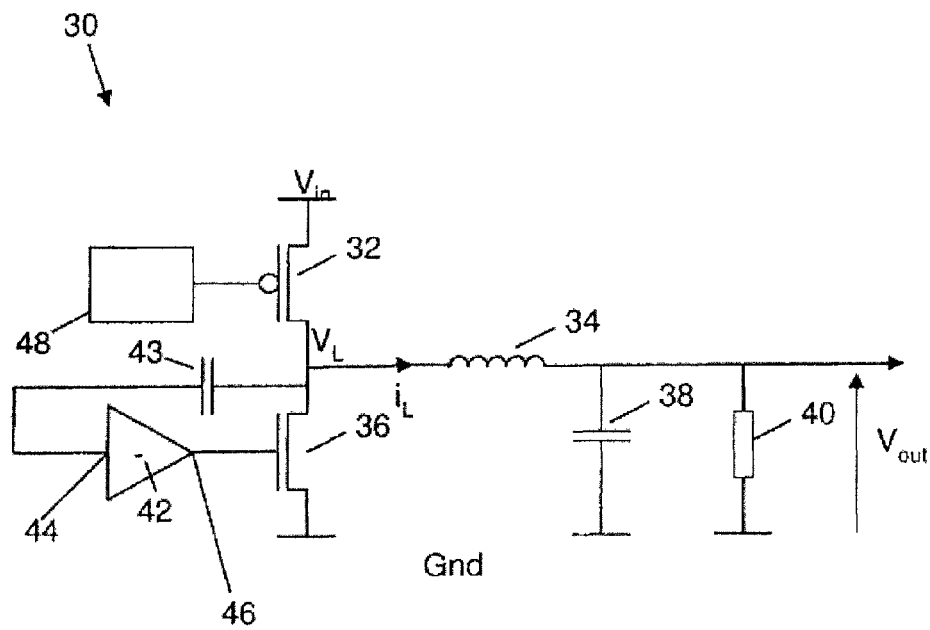
FIG. 2 is a schematic representation of a switch mode regulator according to an embodiment of the present disclosure.

Referring first to the schematic diagram of FIG. 2, a switch mode regulator, which in this example is a step-down (or "Buck") converter for supplying a low output voltage from a higher input voltage, is shown generally at 30. The regulator 30 has a first switch 32, which in this example is a P-channel MOSFET, whose source terminal is connected to a supply voltage and whose drain terminal is connected to an input of an output inductor 34, thus to control a current supply to the output inductor 34. A second switch 36, which in this example is an N-channel MOSFET, is provided, its drain terminal being connected to the input of the output inductor 34 and its source terminal being connected to ground, thus selectively coupling the output inductor 34 to ground. Although in this example the first and second switches 32, 36 are MOSFETs it will be appreciated that the switches 32, 36 may be embodied in other components. A capacitor 38 is provided and is connected at one end to an output of the output inductor 34 and at the other end to ground so as to smooth the output of the regulator 30. A load 40 may be connected to the output of the regulator 30, between the output of the output inductor 34 and ground.

The regulator 30 also includes an inverting amplifier 42, having an input 44 which is connected, by means of a capacitor 43, to the drain terminal of the first switch 32 (and thus to the input of the output inductor 34) and an output 46 which is connected to the gate terminal of the second switch 36. Thus, the output 46 of the inverting amplifier 42 controls the operation and on-resistance of the second switch 36. The capacitor 43 ensures that the input to the inverting amplifier 42 is DC blocked, which facilitates setting bias points of the inverting amplifier 42.

Figure 3:
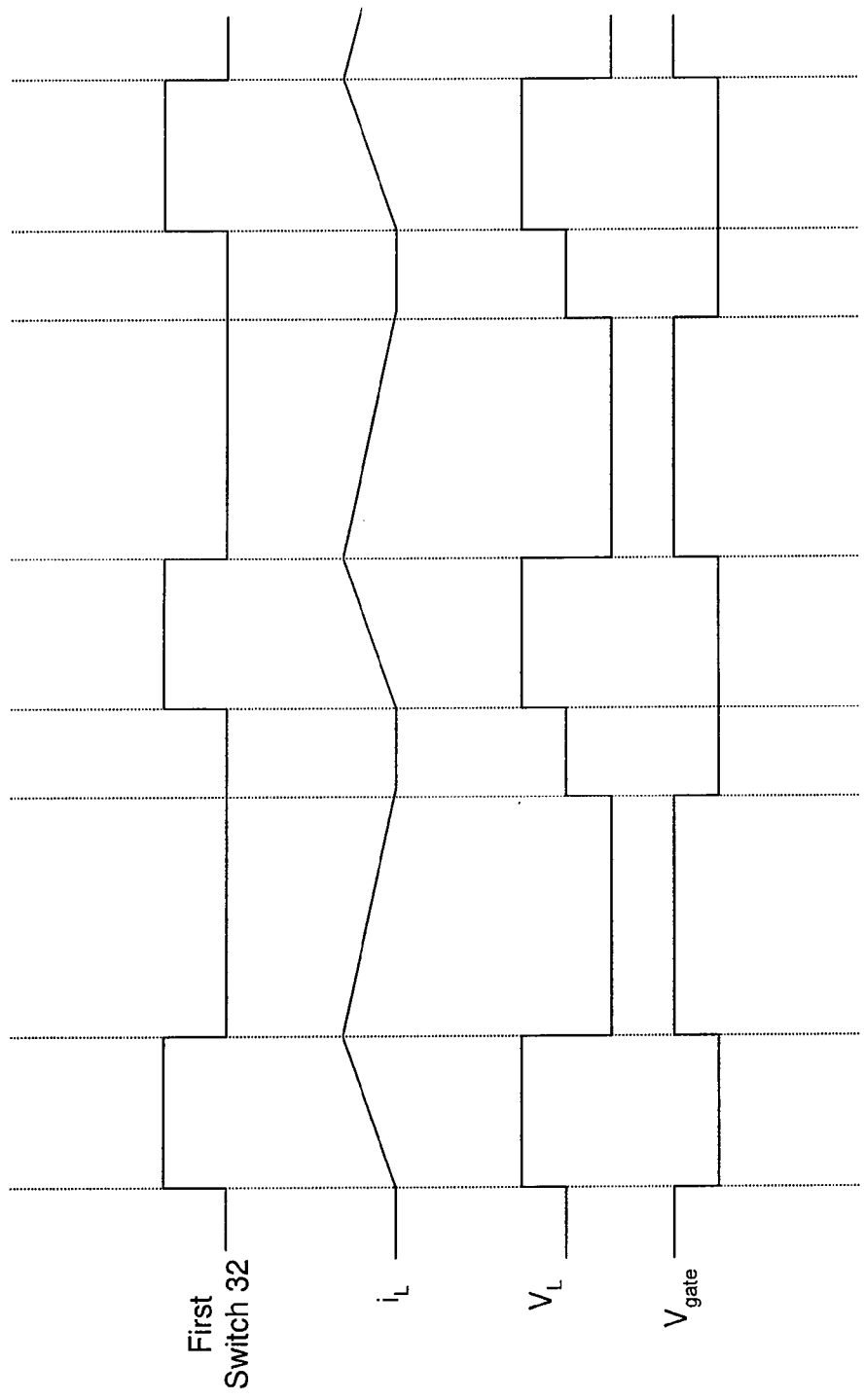
FIG. 3 is a timing diagram illustrating voltages and currents at particular points in the switch mode regulator at particular times.

The operation of the regulator 30 of FIG. 2 will now be described in detail with reference to the timing diagrams of FIG. 3. In FIG. 3 the uppermost trace shows the state (on or off) of the first switch 32, whilst the second trace shows the current flowing in the output inductor 34. The third trace shows the voltage $V_L$ at the input of the output inductor 34 and the lowermost trace shows the voltage $V_{gate}$ at the gate terminal of the second switch 36, from which the output state of the second switch 36 can be determined.

During a first state of operation the first switch 32 is switched on and the current in the output inductor 34 (shown as $i_L$ in FIG. 3) rises from zero to a peak current. During the period in which the first switch 32 is switched on (which is defined by a control circuit 48 controlling the operation of the first switch 32) the voltage $V_L$ at the input of the output inductor 34 is high (equal to the regulator supply voltage $V_{in}$). During this period the inverting amplifier 42 settles to its quiescent state, where the voltage at its output 46 is held low, thus keeping the second switch 36 in a switched off state, in which there is no current path between the output inductor 34 and ground.

When the first switch 32 is switched off by the control circuit 48, current is flowing in a positive sense from the output inductor 34 to the load 40. A back-EMF develops across the output inductor 34 such that with the first switch 32 switched off the voltage $V_L$ at the input of the output inductor 34 is driven to a low voltage. This voltage (which is present at the input 44 of the inverting amplifier 42) falls sufficiently fast to force the voltage at the output 46 of the inverting amplifier to a sufficiently high voltage to cause the second switch 36 to switch on, thereby providing a low-resistance current path between the output inductor 34 and ground.

If the voltage at the output 46 of the inverting amplifier 42 drops, for example as a result of noise or other spurious signals, while positive current (i.e. current flowing through the second switch 36 and the output inductor 34 to the load) is flowing in the output inductor 34, the on-resistance of the second switch increases, causing the voltage $V_L$ at the input 44 of the inverting amplifier 42 to decrease. This in turn leads to an increase in the voltage at the output 46 of the inverting amplifier 42, which causes the second switch 36 to switch on more fully (i.e. its on-resistance drops) and the low-resistance current path between the output inductor 34 and ground is maintained. Thus, when the positive current in the output inductor 34 is dropping towards zero with the first switch 32 switched off and the second switch 36 switched on the regulator 30 operates in a stable operating state.

As the current in the output inductor 34 becomes negative (i.e. passing from the load through the inductor towards the drain terminal of the first switch 32) when the first switch 32 is switched off, the voltage $V_L$ at the input 44 of the inverting amplifier 42 increases. This causes the voltage at the output 46 of the inverting amplifier 42 to decrease, thereby increasing the on-resistance of the second switch 36. As the on-resistance of the second switch 36 increases, the voltage $V_L$ at the input 44 of the inverting amplifier 42 also increases, causing a positive feedback situation in which the regulator 30 operates in an unstable operating mode, since the output 46 of the inverting amplifier 42 continues to decrease, thus further increasing the on-resistance of the second switch 36. After a very short time the voltage at the output 46 of the inverting amplifier 42 is sufficiently low to cause the second switch 36 to switch off entirely, thus preventing any loss of current through the second switch 36 to ground, and bringing the regulator 30 into a high-impedance mode of operation in which both the first switch 32 and the second switch 36 are switched off. Because of the very short time involved in fully switching the second switch 36 off, this is shown in the timing diagram of FIG. 3 as an instantaneous change from on to off, but it will be appreciated that there is a short period of time during this unstable mode of operation in which the on-resistance of the second switch 36 increases before finally the second switch 36 is switched off.

It will be appreciated from the foregoing description that the step-down regulator 30 described above is able rapidly to detect the point at which the current flowing in the output inductor 34 drops to zero and to change the operating mode of the regulator 30 accordingly automatically at the correct time, thus reducing the problems of overshooting and ringing, and undesired losses through the second switch 36. The regulator 30 is also able rapidly to detect the transition which occurs when the first switch 32 is switched off, to cause the second switch 36 to switch on automatically at that point, and to maintain a stable operating state whilst the current in the output inductor 34 drops to zero.

Figure 4:
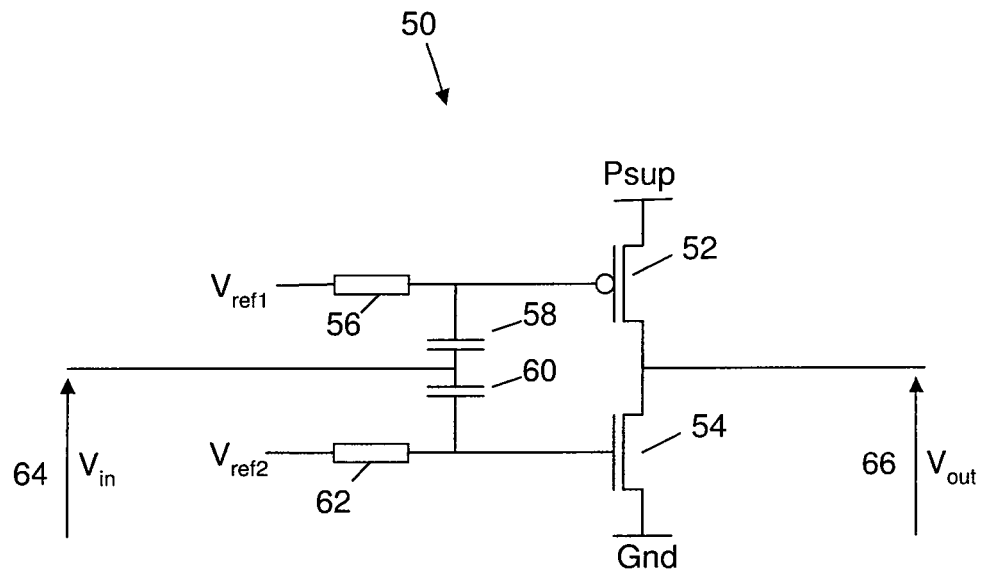
FIG. 4 is a schematic representation of an inverting amplifier which is suitable for use in the switch mode regulator shown in FIG. 2.

FIG. 4 is a schematic representation of an exemplary inverting amplifier circuit which is suitable for use in the regulator 30 of FIG. 2. This circuit is particularly suited to this application as it has a high gain and can be made to draw almost no quiescent current if appropriate component values and bias voltages are selected. It will be appreciated however that other inverting amplifiers could equally be used in the regulator 30 and that the disclosure is not limited to a particular design of inverting amplifier.

The inverting amplifier is shown generally at 50 in FIG. 4 and has a P-channel MOSFET 52 whose source terminal is connected to a power supply rail Psup. The drain terminal of the P-channel MOSFET 52 is connected to the drain terminal of an N-channel MOSFET 54, whose source terminal is connected to ground. The gate terminal of the P-channel MOSFET 52 is connected to a node between a first resistor 56 and a first capacitor 58, the first resistor 56 being connected at one end to a reference voltage $V_{ref1}$, and the first capacitor 58 being connected in series to a second capacitor 60, which is connected in series to a second resistor 60, which in turn receives a reference voltage $V_{ref2}$. The two reference voltages may be set at the same or different voltages, and each may be, for example, the same voltage as the supply voltage, or may be any other convenient voltage. The gate terminal of the N-channel MOSFET 54 is connected to a node between the second capacitor 60 and the second resistor 62. An input 64 to the inverting amplifier 50 is connected to a node between the first and second capacitors 58, 60, whilst an output 66 of the inverting amplifier 50 is connected to the drain terminal of the P-channel MOSFET 52.

In operation of the inverting amplifier 50, a voltage is applied to the input 64. If this input voltage is decreased, the gate terminal of the P-channel MOSFET 52 is pulled low, thus switching the P-channel MOSFET 52 on. The gate terminal of the N-channel MOSFET 54 is also pulled low, switching the N-channel MOSFET 54 off. Thus, the output voltage of the inverting amplifier 50 is high (approximately equal to the supply voltage).

If the input voltage is increased, the gate terminal of the N-channel MOSFET 54 is pulled high, switching the N-channel MOSFET 54 on. The gate terminal of the P-channel MOSFET 52 is pulled high, turning the P-channel MOSFET 52 off. Thus a low-resistance current path exists through the N-channel MOSFET 54, causing the output voltage to be close to zero volts.

It will be appreciated that the network formed by the resistor 56 and the capacitor 58 has a time constant which is equal to the value $R_{56}$ of the resistor 56 multiplied by the value $C_{58}$ of the capacitor 58. This time constant should be short, so that the P-channel MOSFET 52 returns to its quiescent state shortly after the output 64 of the inverting amplifier 50 goes high. The inverting function is then mainly achieved though the action of the N-channel MOSFET 54. This permits the current consumption of the inverting amplifier 50 to be low.

Similarly, the network formed by the resistor 62 and the capacitor 60 has a time constant which is equal to the value $R_{62}$ of the resistor 62 multiplied by the value $C_{60}$ of the capacitor 60. This time constant should be approximately equal to the expected pulse width of the regulator 30 in order to optimise the biasing of the N-channel MOSFET 54.

Although the resistors 56, 62 of the inverting amplifier are shown in FIG. 4 as discrete components it will be understood that they could alternatively be implemented as high output impedance active circuitry.

Figure 5:
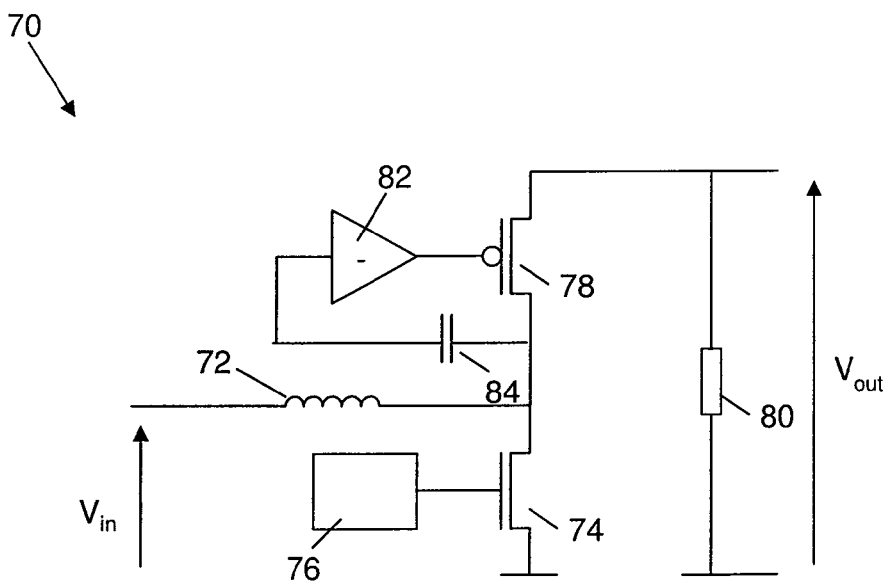
FIG. 5 is a schematic representation of a switch mode regulator according to another embodiment of the disclosure.

The regulator 30 described above is a step-down converter, but the principles used in the regulator 30 can equally be applied to step-up (or "boost") converters. FIG. 5 is a schematic representation of one embodiment of such a step-up converter.

The step-up regulator is shown generally at 70, and has an input inductor 72 which is connected at an input end to an input voltage supply. The drain terminal of a first switch 74, which in this example is an N-channel MOSFET, is connected to an output end of the input inductor 72, with the source channel of the first switch being connected to ground. The gate terminal of the first switch 74 is connected to a control circuit 76. Thus, the first switch 74 controls a current supply to the input inductor 72.

A second switch 78, which in this example is a P-channel MOSFET, selectively provides a current path from the output end of the input inductor 78 to a load 80. The drain terminal of the second switch 78 is connected to the output end of the input inductor 72, with the source terminal being connected to the load 80. An inverting amplifier 82 is provided, having an input which is connected to the output end of the input inductor 72 by means of a capacitor 84, with an output of the inverting amplifier 82 being connected to the gate terminal of the second switch 78. The capacitor 84 ensures that the input to the inverting amplifier 82 is DC blocked, which facilitates setting bias points of the inverting amplifier 82.

During a first state of operation of the regulator 70, the first switch 74 is switched on by the control circuit 76. A current in the input inductor 72 rises from zero to a peak current. During the period in which the first switch 74 is switched on the voltage $V_L$ at the output of the input inductor 72 is zero. During this period the inverting amplifier 82 settles to its quiescent state where the voltage at its output is held high, thus keeping the second switch 78 in a switched off state, in which there is no current path between the input inductor 72 and the load 80.

When the first switch 74 is switched off by the control circuit 76, current is flowing in a positive sense from the supply through the input inductor 72. A back-EMF develops across the input inductor 72 such that with the first switch 74 switched off the voltage $V_L$ at the output of the output inductor 72 is driven to a high voltage. This voltage (which is present at the input of the inverting amplifier 82) rises sufficiently fast to force the voltage at the output of the inverting amplifier 82 to a sufficiently low voltage to cause the second switch 78 to switch on, thereby providing a low-resistance current path between the output inductor 72 and the load 80.

If the voltage at the output of the inverting amplifier 82 increases, for example as a result of noise or other spurious signals, while positive current (i.e. current flowing through the input inductor 72 and the second switch 76 to the load) is flowing in the input inductor 72, the on-resistance of the second switch 78 increases, causing the voltage $V_L$ at the input of the inverting amplifier 82 to increase. This in turn leads to a decrease in the voltage at the output of the inverting amplifier 82, which causes the second switch 78 to switch on more fully (i.e. its on-resistance drops) and the low-resistance current path between the output inductor 72 and the load is maintained. Thus, when the positive current in the input inductor 72 is dropping towards zero with the first switch 74 switched off and the second switch 78 switched on the regulator 70 operates in a stable operating state.

As the current in the input inductor 72 becomes negative (i.e. passing from the load through the second switch and the inductor towards the supply) when the first switch 74 is switched off, the voltage $V_L$ at the input of the inverting amplifier 82 decreases. This causes the voltage at the output of the inverting amplifier 82 to increase, thereby increasing the on-resistance of the second switch 78. As the on-resistance of the second switch 78 increases, the voltage $V_L$ at the input of the inverting amplifier 82 also increases, causing a positive feedback situation in which the regulator 30 operates in an unstable operating mode, since the output of the inverting amplifier 82 continues to increase, thus further increasing the on-resistance of the second switch 78. After a very short time the voltage at the output of the inverting amplifier 82 is sufficiently high to cause the second switch 78 to switch off entirely, thus preventing any loss of current from the load 80 through the second switch 78, and bringing the regulator 30 into a high-impedance mode of operation in which both the first switch 74 and the second switch 78 are switched off.

The regulators 30, 70 described above can be implemented using discrete components, or may be embodied in silicon as integrated circuits or parts of larger integrated circuits. Thus, the disclosure extends to an integrated circuit including a switch mode regulator 30, 70 of the type described above and illustrated in the accompanying drawings.

The invention claimed is:

1. A switch mode regulator comprising:
   an output inductor;
   a first switch for controlling a current supply to the output inductor of the regulator, the first switch having an output;
   a second switch for selectively providing a conductive path to ground for current flowing through the output inductor, the second switch having a control input;
   an inverting amplifier having an input connected to the output of the first switch and an output connected to the control input of the second switch;
   wherein the regulator is configured so that:
   i) when the first switch is turned off, a back-EMF is developed across the output inductor, forcing the input of the inverting amplifier to a low voltage such that its output is driven high causing the second switch to switch on;
   ii) if the output voltage of the inverting amplifier drops while positive current is flowing in the output inductor, the on-resistance of the second switch increases, causing the voltage at the input of the inverting amplifier to decrease, leading to a stable operating state; and
   iii) if the output voltage of the inverting amplifier drops while negative current is flowing in the inductor, the on-resistance of the second switch increases, causing the voltage at the input of the inverting amplifier to increase, leading to an unstable operating state resulting in the second switch being switched off.

2. A switch mode regulator comprising:
   an input inductor;
   a first switch for controlling a current supply to the input inductor of the regulator, the first switch having an output;
   a second switch for selectively providing a conductive path to a load for current flowing through the input inductor, the second switch having a control input;
   an inverting amplifier having an input connected to the output of the first switch and an output connected to the control input of the second switch;
   wherein the regulator is configured so that:
   i) when the first switch is turned off, a back-EMF is developed across the inductor, forcing the input of the inverting amplifier to a high voltage such that its output is driven low causing the second switch to switch on;
   ii) if the output voltage of the inverting amplifier increases while positive current is flowing in the inductor, the on-resistance of the second switch increases, causing the voltage at the input of the inverting amplifier to increase, leading to a stable operating state; and
   iii) if the output voltage of the inverting amplifier increases while negative current is flowing in the inductor, the on-resistance of the second switch increases, causing the voltage at the input of the inverting amplifier to increase, leading to an unstable operating state resulting in the second switch being switched off.

3. The switch mode regulator according to claim 1 wherein the input of the inverting amplifier is connected to the output of the first switch by a capacitor.

4. The switch mode regulator according to claim 2 wherein the input of the inverting amplifier is connected to the output of the first switch by a capacitor.

5. The switch mode regulator according to claim 1 wherein the first switch and the second switch comprise MOSFETs.

6. The switch mode regulator according to claim 2 wherein the first switch and the second switch comprise MOSFETs.

7. The switch mode regulator according to claim 1 wherein the inverting amplifier has a high gain and draws little quiescent current.

8. The switch mode regulator according to claim 2 wherein the inverting amplifier has a high gain and draws little quiescent current.

9. The switch mode regulator according to claim 1 wherein the inverting amplifier comprises a first resistor-capacitor network coupled to an output P-channel MOSFET, the time constant of the first resistor-capacitor network being selected such that the output P-channel MOSFET conducts a very low current after the output of the inverting amplifier has been driven high.

10. The switch mode regulator according to claim 9 wherein the inverting amplifier further comprises a second resistor-capacitor network coupled to an output N-channel MOSFET, the time constant of the second resistor-capacitor network being selected to be approximately equal to an expected duration of an output pulse of a controller of the first switch of the switch mode regulator.

11. The switch mode regulator according to claim 2 wherein the inverting amplifier comprises a first resistor-capacitor network coupled to an output N-channel MOSFET, the time constant of the first resistor-capacitor network being selected such that the output N-channel MOSFET conducts a very low current after the output of the inverting amplifier has been driven low.

12. A switch mode regulator according to claim 11 wherein the inverting amplifier further comprises a second resistor-capacitor network coupled to an output P-channel MOSFET, the time constant of the second resistor-capacitor network being selected to be approximately equal to an expected duration of an output pulse of a controller of the first switch of the switch mode regulator.

13. An integrated circuit comprising a switch mode regulator according to claim 1.

14. An integrated circuit comprising a switch mode regulator according to claim 2.

* * * * *